United States Patent
Swander et al.

(10) Patent No.: US 7,308,711 B2
(45) Date of Patent: *Dec. 11, 2007

(54) METHOD AND FRAMEWORK FOR INTEGRATING A PLURALITY OF NETWORK POLICIES

(75) Inventors: Brian D. Swander, Bellevue, WA (US); William H. Dixon, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 835 days.

This patent is subject to a terminal disclaimer.

(21) Appl. No.: 10/456,093

(22) Filed: Jun. 6, 2003

(65) Prior Publication Data

US 2005/0010765 A1    Jan. 13, 2005

(51) Int. Cl.
*G06F 9/00* (2006.01)

(52) U.S. Cl. .................. 726/13; 726/12; 726/14; 713/166; 709/232

(58) Field of Classification Search ........... 713/166, 713/12, 13, 14; 709/32, 232; 726/12, 13, 726/14

See application file for complete search history.

(56) References Cited

U.S. PATENT DOCUMENTS

| | | | |
|---|---|---|---|
| 5,606,668 A * | 2/1997 | Shwed .................. 726/13 |
| 5,835,726 A * | 11/1998 | Shwed et al. .......... 709/229 |
| 5,968,176 A * | 10/1999 | Nessett et al. .......... 726/11 |
| 5,987,611 A | 11/1999 | Freund |
| 6,003,084 A | 12/1999 | Green et al. |
| 6,009,475 A | 12/1999 | Shrader |
| 6,131,163 A * | 10/2000 | Wiegel .................. 726/12 |
| 6,154,775 A | 11/2000 | Coss et al. |
| 6,253,321 B1 * | 6/2001 | Nikander et al. ......... 713/160 |
| 6,347,376 B1 * | 2/2002 | Attwood et al. .......... 726/1 |
| 6,496,935 B1 * | 12/2002 | Fink et al. .............. 726/13 |
| 7,024,460 B2 * | 4/2006 | Koopmas et al. ........ 709/206 |
| 7,120,931 B1 * | 10/2006 | Cheriton ................. 726/13 |
| 2002/0097724 A1 * | 7/2002 | Halme et al. ............ 370/392 |
| 2002/0162026 A1 | 10/2002 | Neuman et al. |
| 2003/0084331 A1 | 5/2003 | Dixon et al. |
| 2003/0110379 A1 * | 6/2003 | Ylonen et al. ........... 713/164 |

(Continued)

FOREIGN PATENT DOCUMENTS

EP    0 910 197 A2    4/1999

OTHER PUBLICATIONS

European Search Report from corresponding European Application No. 04009309 filed Apr. 20, 2004.

(Continued)

*Primary Examiner*—Kim Vu
*Assistant Examiner*—April Y. Shan
(74) *Attorney, Agent, or Firm*—Wolf, Greenfield & Sacks, P.C.

(57) ABSTRACT

A method and system is disclosed for managing and implementing a plurality of network policies in a network device. Each of the plurality of policies are defined by one or more filters. The filters are installed in a policy engine. A layer identifies the network policy to be applied to a packet by sending a request to the policy engine. The policy engine then returns the policy to the requesting layer. The method and system may be used to implement a programmable, host-based, distributed, authenticating firewall that enables security and other policies to be applied at several protocol layers.

15 Claims, 10 Drawing Sheets

U.S. PATENT DOCUMENTS

2004/0250131 A1 12/2004 Swander et al.
2005/0005165 A1 1/2005 Morgan et al.
2005/0022010 A1 1/2005 Swander et al.
2005/0022011 A1 1/2005 Swander et al.

OTHER PUBLICATIONS

Strassner, J., et al., *Policy Framework Core Information Model*, Internet Draft, May 17, 1999XP002255652.

Abhishek Vagish et al., NT 5.1 IPSecurity Security Policy Database, Microsoft Corporation, 1999.

* cited by examiner

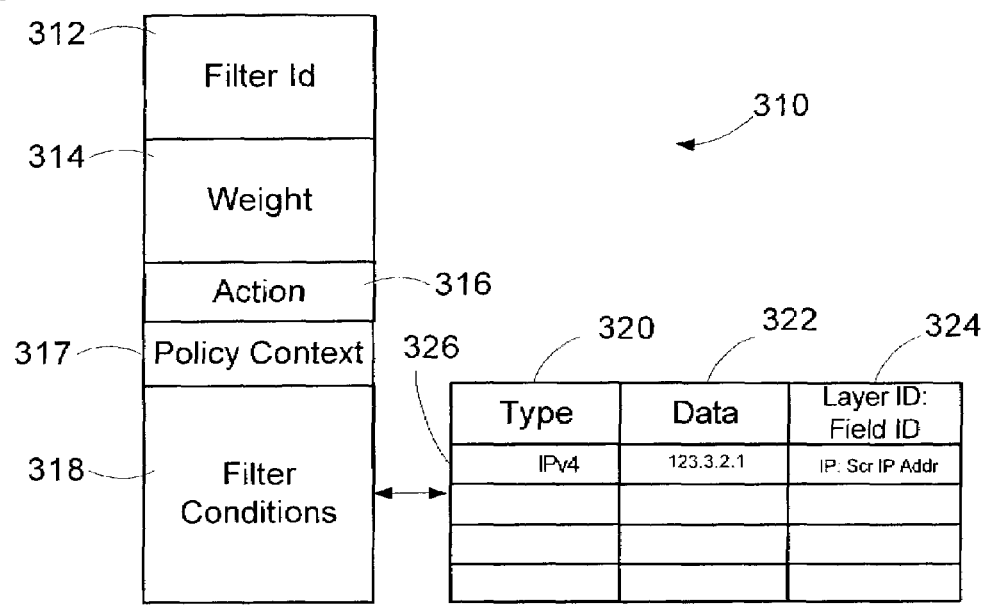

METHOD AND FRAMEWORK FOR INTEGRATING A PLURALITY OF NETWORK POLICIES

RELATED APPLICATIONS

The present application contains subject matter related to that of patent applications "Multi-Layer Based Method for Implementing Network Firewalls," Ser. No. 10/456,770; "Multi-Layered Firewall Architecture Implemented in a Network Device," Ser. No. 10/456,766, and "Method for Managing Network Filter Based Policy," Ser. No. 10/456, 433, filed on the same day as the present application, the disclosures of which are hereby expressly incorporated by reference.

TECHNICAL FIELD

This invention generally relates to computer systems and to network security. More particularly, this invention relates to a method of integrating a plurality of network policies into a single framework within a network device.

BACKGROUND OF THE INVENTION

Network protocols are designed to facilitate communication between network devices through an open exchange of data. While the open exchange of data greatly enhances the use of network devices to accomplish tasks, it also creates problems because network protocols are not designed for, and generally do not provide, network security. Computers coupled to both public and private networks, such as Local Area Networks (LANs), Wide Area Networks (WANs), intranets, and the Internet are susceptible to malicious attacks perpetrated by other network devices coupled either directly or indirectly to the network. Such malicious attacks include theft of data, Denial of Service (DOS) attacks, the proliferation of computer viruses, and the like.

Various methods have been developed to protect network devices against malicious attacks usually through implementation of one or more network policies. One network policy is a security policy such as provided for by the Internet Protocol Security (IPSec) Suite. The IPSec suite provides protocols such as Encapsulating Security Protocol (ESP), Authentication Header (AH), and Internet Key Exchange and Management (IKE) protocol. The ESP protocol, documented in Internet Engineering Task Force (IETF) Request for Comments (RFC) 2406, is an authenticating and encrypting protocol that uses cryptographic mechanisms to provide integrity, source authentication, and confidentiality of data. The AH protocol, documented in IETF RFC 2402, is an authentication protocol that uses a hash signature in the packet header to validate the integrity of the packet data and authenticity of the sender.

The IKE protocol, documented in IETF RFC 2409, provides a method for network devices to negotiate security settings used with the AH and ESP formats. The negotiated security settings form a data structure called a security association (SA). The SA defines parameters such as the authentication algorithm, encryption algorithm, keys, and the lifetime of keys, used by ESP or AH to protect the contents of the IP packet. Because ESP and AH require an established SA, an IKE negotiation is executed before the ESP or AH protocols are used to transmit data.

A network device identifies packets that are subject to IPSec, e.g. IKE, AH, or ESP, processing and the manner that such packets should be IPSec processed based on a security policy maintained in a Security Policy Database (SPD). The security policy is a set of rules assigned to the network device that defines how to use IPSec. The security policy includes filter lists, authentication methods and other information. The proper security policy to be applied to a packet is usually determined based upon the packet's source and destination IP address, source and destination ports, and protocol type.

Another network policy used to protect against malicious attacks is a firewall policy. The firewall policy is implemented by one or more filters. Each filter includes filter parameters and associated policy to be applied to packets that match the filter parameters. The filter parameters include information such as hardware addresses, e.g. Media Access Control (MAC) addresses, network addresses, e.g., IP addresses, protocol type, e.g. Transport Control Protocol (TCP), port numbers, and the like. The firewall policy in the filter identifies how packets with parameters that match the filter parameters should be treated. As a specific example, the filter includes as its parameters a Uniform Resource Locator (URL) address, e.g. "http://www.foo.com." The filter policy indicates that packets with that URL address should be dropped. Whenever the network device examines a packet and through that examination identifies the URL address "http://www.foo.com" as embedded in the packet, the network device drops the packet thereby preventing it from traversing the network.

Network devices also use non-security related policies to control the flow of network traffic. As one example, network devices implement Quality of Service (QOS) based policy. QOS addresses the fact that transmission rates, error rates, and other characteristics can be measured, improved, and to some extent guaranteed in advance. Packets can be expedited based on policy and reservation criteria. QOS is used, for example, to allocate network bandwidth for improved communications between network devices.

It is not uncommon for multiple policies, e.g. security policy, firewall policy, QOS policy, and the like to be implemented in a network device. These policies may conflict, i.e. identify contradictory actions to take on the same packet. Implementing multiple network policies in a network device also makes it difficult to diagnose packet transmission problems. For example, if packets are not being properly transmitted or received, it is difficult to identify which of the network policies is interfering with the packets.

SUMMARY OF THE INVENTION

The invention is directed to a method and framework for implementing a plurality of network policies in a network device. The plurality of network polices are defined by a set of filters installed in a policy engine. Each filter includes a set of filter conditions, an action, and a policy context. The filter conditions include parameters that allow the policy engine to identify one or more filters that match a packet. The action and policy context identify the network policies that apply to packets matching the filter conditions.

A requesting layer sends a request to the policy engine with a set of parameters associated with the packet. The policy engine identifies one or more matching fibers for the packet by comparing the parameters associated with the packet to the filter conditions. The network policy is then identified from the policy context and action in the matching filters. After the network policy is identified, it is executed by the network device.

In an embodiment of the invention, one of the plurality of network policies is a firewall policy implemented by including as the action in the set of filters, permit or block thereby identifying whether packets matching the filter conditions should be permitted to traverse layers in a network stack or conversely blocked from further network traversal.

In an embodiment of the invention, one of the plurality of policies is a security policy including as the policy context data identifying the security policy to be applied to packets matching the filter conditions.

In an embodiment of the invention, one of the plurality of policies is a quality of service policy including as the policy context data identifying communication settings to be applied to packets matching the filter conditions.

The method and framework of the present invention may be used to implement a programmable, host-based, distributed authenticating firewall that enables security and other policies to be applied at several protocol layers. Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 illustrates an exemplary data structure for a policy filter;

FIG. 5 illustrates an exemplary data structure for packet context;

DETAILED DESCRIPTION OF THE INVENTION

Figure 1:
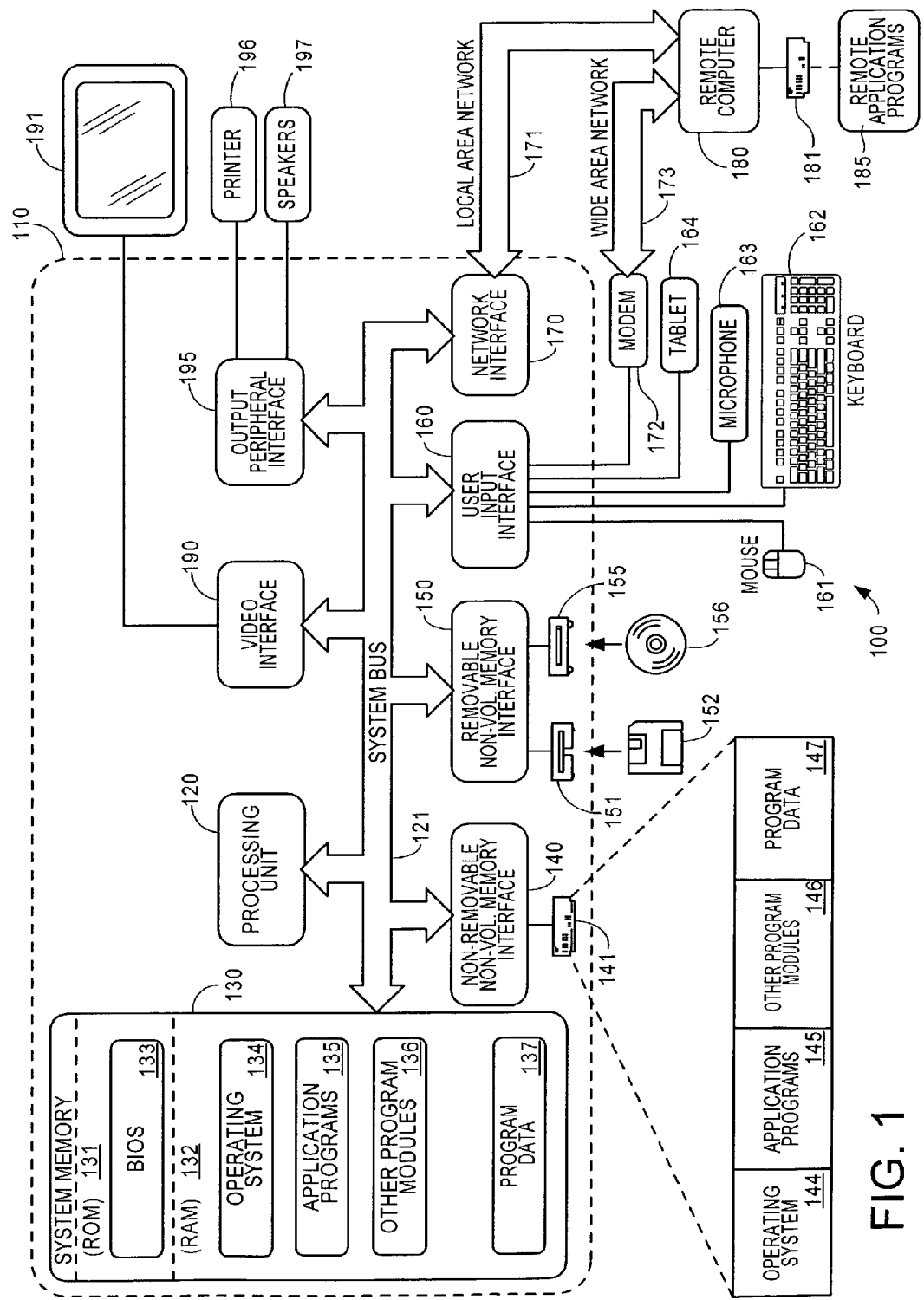
FIG. 1 is a block diagram generally illustrating an exemplary computer system on which the present invention resides.

A method and framework of implementing and managing a plurality of filter based network policies in a network device is described. Typical filter based network policies include security policy, firewall policy, and QOS policy. The plurality of filter based network policies are stored in a filter policy engine.

The filter based policies are implemented in a framework that includes a user policy engine and a kernel policy engine. The framework also includes kernel layers and user layers. The kernel policy engine, kernel layers, and one or more callouts execute within the kernel mode of an operating system. The kernel layers include an application layer, a transport layer, a network layer, and link layer forming a network stack. The user policy engine and user mode layers execute in an operating system user mode, along with one or more policy providers. An exemplary user layer is a keying module layer used to identify security policy. Alternatively, the method and framework of the present invention executes within a single operating system mode, or within one or more program modules or applications executing outside of the operating system.

The user layers and kernel layers each form a requesting layer that receive a packet and corresponding packet context data from a previous layer or system process. The requesting layer sends a request to the kernel policy engine or the user policy engine via an application programming interface (API). The request includes information such as the packet received by the requesting layer, the packet context, and a set of layer parameters associated with the requesting layer. The policy engine processes the request and returns an action and policy context. The layer then implements the network policy according to the action and policy context.

The plurality of network policies are defined by a set of installed filters. Each of the set of installed filters includes a set of filter conditions, an action, and policy context. The action is used to return firewall policy such as permit or block. The policy context includes other policy such as security or QOS policy. The kernel or user policy engine processes the request sent from the requesting layer by identifying one or more matching filters. The matching filters have filter conditions that match the layer parameters and packet context.

The policy providers are used to create network policy and derive the policy from any suitable source such as volatile or non-volatile memory or through a graphical user interface. The policy is a source of information for rendering a new filter, including the set of filter conditions, action, and policy context. The user policy engine adds the new filter to the set of installed filters in the user policy engine or kernel policy engine.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
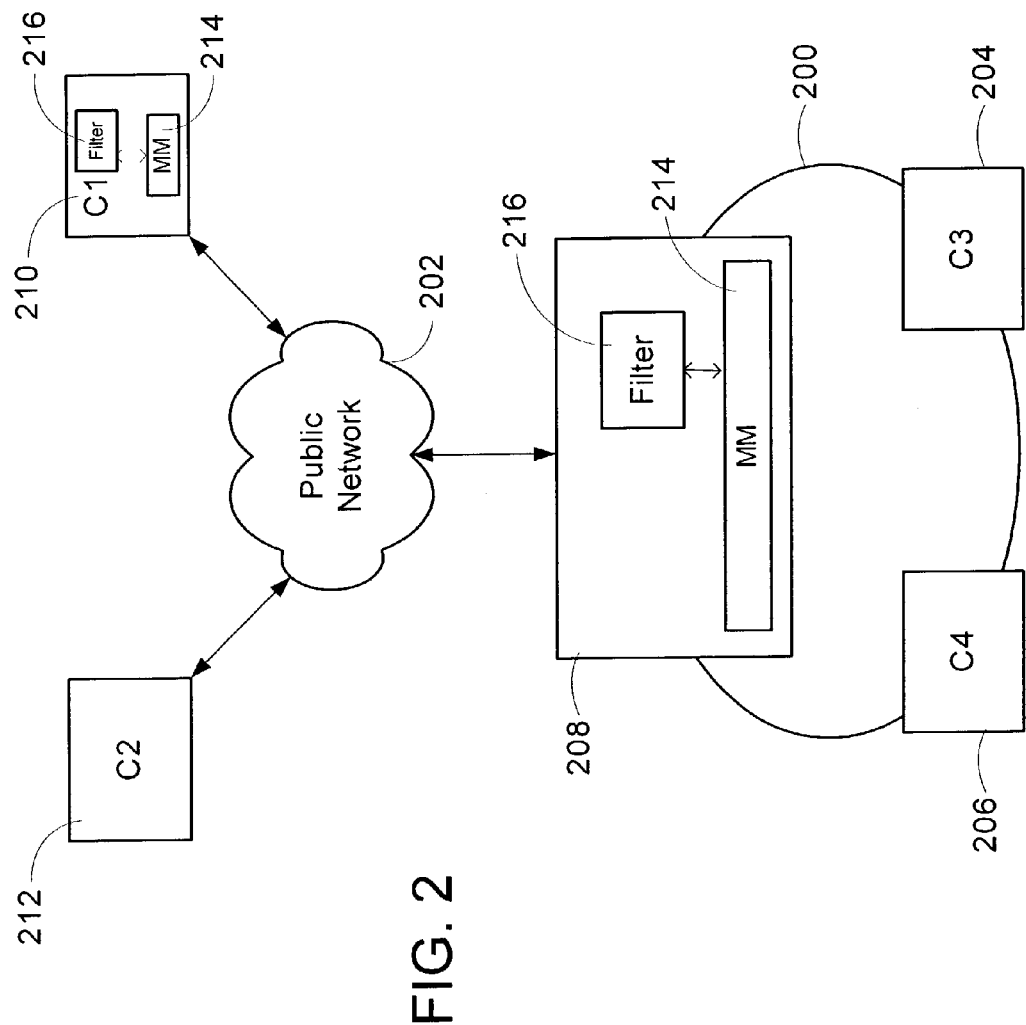
FIG. 2 is a block diagram of an exemplary network environment wherein the present invention may be used.

A network environment wherein the method of implementing and managing a plurality of filter based network policies according to the present invention will now be described with reference to FIG. 2. The network is exemplary in nature as the method of the present invention is implemented in any network device that is coupled to any network configuration. The network environment includes a private network 200 and a public network 202. The private network 200 and public network 202 are any suitable type such as Local Area Networks (LANs), Wide Area Networks (WANs), intranets, the Internet, or any combination thereof.

The network environment includes a plurality of network devices 204, 206, 208, 210 and 212. Network devices 204, 206 are coupled to the private network 200. Network devices 210, 212 are coupled to the public network 202. The network device 208 is coupled to, and provides an interface between, both the private network 200 and the public network 202. The network devices are coupled to the public and private networks using any suitable technology such as Ethernet, 1394, or 802.11(b). The network devices are further implemented as any suitable computing devices such as personal computers, servers, handheld devices, printers, switches, routers, bridges, repeaters or the like.

The network device 208 includes a filter management module 214 and one or more filters 216. The management module 214 is a program module or a set of program modules, implemented according to the present invention. The management module 214 examines network packets exchanged between the network devices 204, 206, 208 coupled to the private network 200 and the network devices 210, 212 coupled to the public network 202. In an embodiment of the invention, the management module 214 also examines locally destined network packets sent from, and destined to, network devices within the private network 200.

The management module 214 controls network traffic exchanged between the private network 200 and the public network 202. Alternatively, the management module 214 is implemented in, and controls network traffic for, a single network device such as illustrated in the network device 210. The management module is also capable of being implemented as a centrally administered set of hosts and/or edge network devices The filters 216 are implemented as part of the management module 214. Alternatively, the filters 216 are implemented as part of a separate data structure accessible by the management module 214. Each filter 216 includes a set of filter conditions, an action, and policy context. The filter conditions are used to identify data that is subject to network policy and include information such as interface numbers, hardware addresses, network addresses, protocol type, port numbers, and payload data. The action is used to implement firewall policy and indicates how the network device implementing the management module should treat packets that match the filter conditions. Typical actions include permit, i.e. allow the packet to continue network traversal, and block, i.e. preclude further network traversal by dropping packet. The policy context is used to store information identifying other network policies, such as security and QOS policies, which are likewise to be applied to packets matching the filter conditions.

As used herein, the term network packet or packet refers to data. The data may be formatted according to a network protocol such as IP, TCP, HTTP or may include a basic data stream. By comparing packet information, referred to herein as packet parameters, to the filter conditions, the management module identifies one or more matching filters. A matching filter results when the filter conditions match the packet parameters. The packet parameters include information that is derived from the packets and includes packet context information and layer parameters. When the management module identifies a matching filter, the one or more actions and/or policy context associated with the filter conditions are executed.

Figure 3:
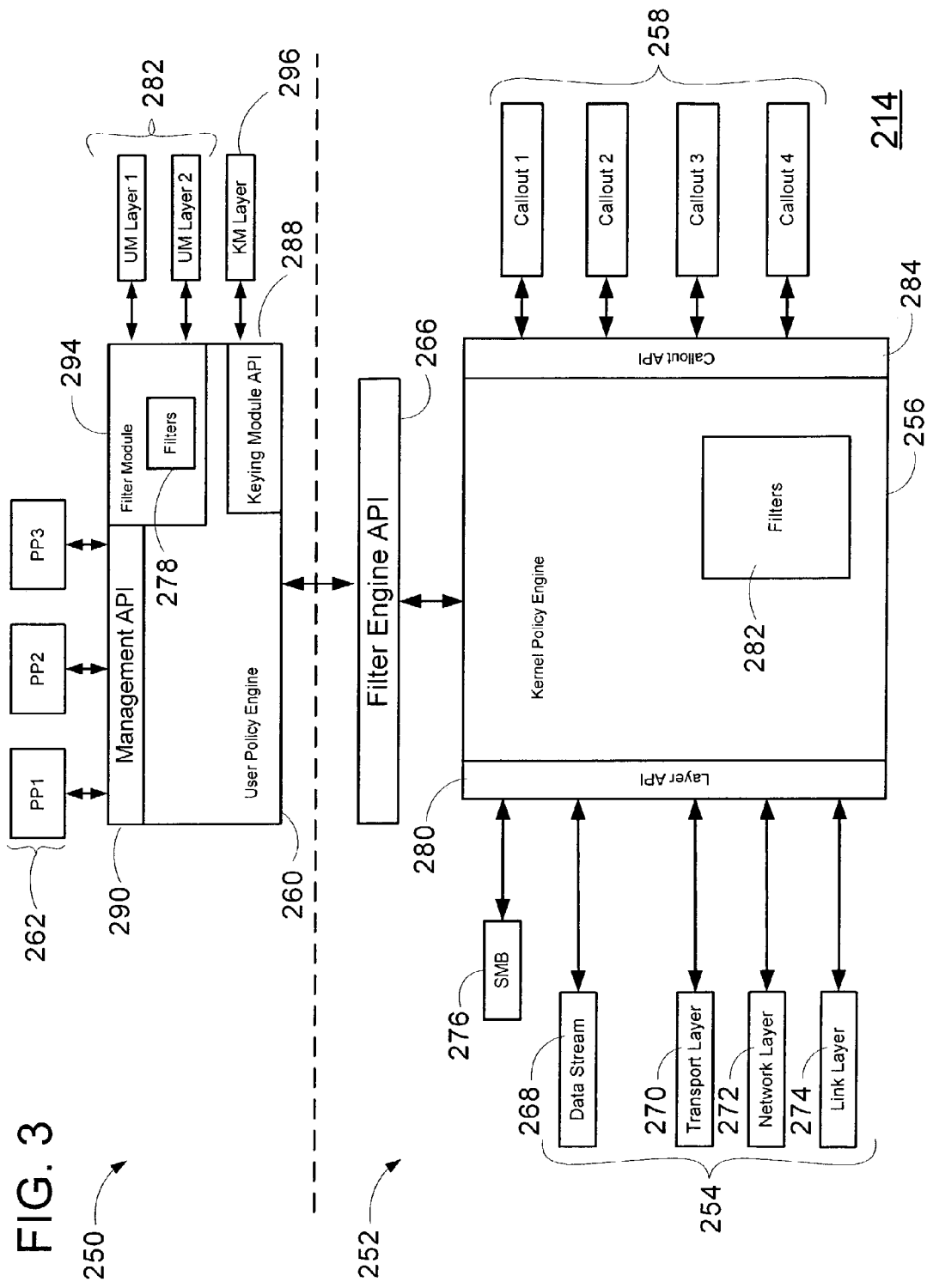
FIG. 3 is a block diagram of a system architecture used to implement and manage a plurality of network policies.

FIG. 3 shows an exemplary architecture of the management module 214. The architecture of the management module 214 allows packets to be subject to filters at both kernel and user layers. The architecture provides central management capabilities that allow filters to be added and deleted and for filter conflicts to be identified and resolved. The management module 214 is extensible in that kernel or user mode layers are added and deleted as needed and is expanded to include specialized functionality via callout modules. The present invention is particularly suitable for implementing and managing filters used with a plurality of network policies such as firewalls, Quality of Service (QOS), Internet Protocol Security (IPSec) suite, as well as other encrypting, authenticating, and key management security protocols.

The management module 214 includes a user mode process 250 and a kernel mode process 252. The user mode process 250 and kernel mode process 252 execute as part of an operating system in a network device. Those skilled in the art will appreciate that the user mode process 250 and the kernel mode process 252 of the operating system include additional components that for simplicity are not shown. Alternatively, the management module 214 is executed in whole or in part outside of the operating system as one or more program modules or application programs.

The kernel mode process 252 includes kernel layers 254, a kernel policy engine 256, and optional callouts 258. The kernel mode process 252 implements an established network policy by identifying matching filters for network packets, processing packets according to known protocols, and executing other actions on the packet as designated by matching filters.

In an embodiment of the invention, the kernel layers 254 form a network stack. The network stack comprises a plurality of layers including a data stream layer 268, a transport layer 270, a network layer 272, and a link layer 274. The management module is extensible and additional layers are dynamically added and deleted as needed. An example of an added layer includes file access layer 276, implemented according to a Server Message Block (SMB) protocol. The kernel mode process 252 is preferably configured to implement firewall policy to be applied to packets traversing the kernel layers 254.

The kernel policy engine 256 includes a layer API 280, a set of installed filters 282, and a callout API 284. The kernel policy engine 256 performs various functions according to the method of the present invention including (1) maintaining the set of installed filters 282 defining network policies, e.g., security, QOS, firewall policy and the like, (2) receiving requests from the kernel layers 254, (3) identifying one or more matching filters based on the request, and (4) instructing the layer of any action to take on the packet based on the matching filters and network policy defined therein.

The user policy engine 260 includes a filter module 294. The filter module 294 is an instance of the kernel policy engine 256 in the user mode 250. The instance of the filter module 294 in the user policy engine 260 permits the user policy engine 260 to replicate the services of the kernel policy engine 256 for one or more user layers 282. The user layers 282 are added in the same way that kernel mode layers are created. Because the filter module 294 is the user mode instance of the kernel policy engine 256, it will be understood that any functionality described herein for the kernel policy engine also applies to the filter module 294. For example, additional user mode layers are added or deleted from the system architecture and callouts may be created thereby providing added functionality to the user mode layers. Filters 278 defining network policy are added into the filter module 294, and user mode layers 282 can identify policy for packets or data matching designated parameters by sending a request to the user policy engine 260. While the user layers 282 are shown executing in the operating system user mode, the user layers may also be distributed in other system processes.

The set of installed filters 278, 282 are used to implement one or more network policies. Each filter includes a set of filter conditions, an action, and policy context. As described with reference to FIG. 2, the filter conditions identify the packets that are subject to the filter policy as defined by the action and policy context. The actions specified in the set of installed filters 282 include permit and block. The policy context is any suitable data structure used to store known policy parameters for policies such as security and QOS. An exemplary form of the filters is described with reference to FIG. 4.

The layer API 280 provides an interface between the kernel layers and the kernel policy engine. Through the layer API 280, the requesting layer requests the kernel policy engine to identify network policy to be applied to a packet.

The callouts 258 are used to implement added functionality such as parental controls, intrusion detection, and the like. A callout is executed when the kernel or user policy engine 256 identifies a matching filter for the packet that includes, as the associated action, a callout to one of the callout modules. Additional callouts, like layers, are added as needed thereby providing an extensible architecture. A specific implementation of the callout API 284 is described with reference to FIG. 6.

The user mode process 250 includes the user policy engine 260 and one or more policy providers 262 identified as "PP1," "PP2," and "PP3." The policy providers 262 are processes that add network policy, i.e. installed filters 278, 282, into the management module 214. Any process is used to accomplish this task. An example is a legacy IPSec policy service (LIPS). The legacy IPSec policy service adds filters defining network traffic that is supposed to use Internet Protocol Security (IPSec) such as Encapsulating Security Protocol (ESP) and Authentication Header Protocol (AH). As a specific example, the legacy IPSec policy service adds a firewall policy indicating that all unsolicited inbound packets must be encrypted according to the ESP protocol. The policy further provides that any unsolicited inbound packet in clear text, i.e. an unencrypted packet, should be blocked. The policy providers 262 obtain the policy from any suitable source such as data in volatile or nonvolatile memory, or a Graphical User Interface (GUI) that permits an administrator or system users to directly enter policy. The user policy engine 260 converts the policy into a new filter, i.e. defines the policy in terms of filter conditions and associated actions, and adds the new filter into the set of installed filters 278, 282.

The management module 214 further includes a filter engine API 266 that forms an interface between the user policy engine 260 and the kernel policy engine 256. The engine API 266 provides a mechanism for the user policy engine 260 to add new filters into the set of installed filters 282, and to examine installed filters 282 matching selected criteria for diagnostic purpose. A management API 290, accessible by policy providers 262, also provides a mechanism to add and remove filters from the architecture.

Each user and kernel layer is capable of receiving a packet from a previous layer, module or system process. Each user or kernel layer also maintains packet context, passes the packet context to a next layer or system process, issues a classification request to the kernel or user policy engine, and takes action on the packet according to the one or more network policies.

The packet context is a data structure that follows the packet. Each layer maintains the context by adding into the context data structure a set of parameters that the layer is designed to process or that may be derived from the packet. An exemplary data structure used for the packet context is described with reference to FIG. 5.

The classification request is a call by a layer requesting that any filters that match the packet be identified and any action, e.g. permit or block, and/or associated policy context be returned to the layer. The layer issuing the classification request is referred to herein as a requesting layer. Each layer also takes the action on the packet that is returned by the kernel or user policy engine.

The management module 214 also includes a keying module layer 296. The keying module layer is used to lookup network policies used with keying protocols such as the Internet Key Exchange and Management (IKE) protocol implemented as part of a security protocol such as IPSec. A keying module API 288 provides an interface between the user policy engine 260 and the keying module layer. Filters can be added to the filter module 294 through the user policy engine 260 defining which packets are subject to a given set of security parameters. The keying module API provides a mechanism for other processes to invoke the services of the keying module layer to identify matching installed filters that include policy context identifying the policy to be applied.

Referring to FIG. 4, the set of installed filters 282, which may be installed into filter module 294 or kernel policy provider 256, will now be described. Each filter 310 has a plurality of fields including a filter Id 312, a weight 314, one or more Actions 316, a policy context 317 and a set of filter conditions 318. The filter Id 312 provides a unique identification to the filter.

The weight field 314 includes a value that identifies priority of the filter 310. The higher the value in the weight field 314, the higher the priority of the filter. The filter priority determines the order whereby matching filters are applied to the packet by the kernel policy engine 256 or user policy engine. Alternatively, the filter 310 is manually ordered and the weight field 314 is optionally excluded.

The set of filter conditions 318 determine whether a packet matches the filter 310. Each filter condition 318 includes a type 320, data 322, and a layer Id:field Id 324. The number of filter conditions 318 is dynamically configurable, such that a filter can include any number of filter conditions 318, and filter conditions 318 can be added or deleted as the need arises.

The type 320 defines the length and number of variables included in the corresponding data 322. The architecture provides for predefined known variable types such as Byte, Short, Long, 8 Bytes, String, Internet Protocol version 4 (IPv4) Address, Internet Protocol version 6 (IPv6) Address, IPv4 Address plus Mask, IPv6 Address plus Mask, and Address Range.

The data field 322 includes data matching the type. For example, if the type is IPv4 Address, an acceptable value for the data field 322 is a 32-bit number in range of 00.00.00.00 to 255.255.255.255 as expressed in dotted decimal notation. In some instances, the type 320 provides for multiple values in the data field 322. The Address Range, IPv4 Address plus Mask, and IPv6 Address plus mask types allow two IP address values, defining a beginning and ending range of IP addresses. For maximum flexibility, the architecture also permits user-defined types. Alternatively, additional types are manually added to the system architecture.

The layer Id:field Id field 332 is used to identify an originating layer and a parameter from the originating layer, respectively. The originating layer and the parameter from the originating layer define packet parameters, i.e. layer parameters and packet context that the data 322 is compared against. The originating layer identifies a particular kernel or user layer. The parameter from the originating layer identifies a specific parameter associated with the originating layer. As a specific example is illustrated by filter condition 326. The type is IPv4 thereby indicating the data 322 is a 32-bit IP address. The layer Id is "IP" representing that the 32-bit number is an IP, i.e. network, layer parameter. The field Id is "Src IP Addr" which in the example represents an IP layer parameter, specifically a source IP address. The IP address provided in the data filed is "123.3.2.1" indicating that any packet with that source IP address meets the filter condition thereby matching the filter.

The action 326 designated in the filter 310 is permit, block, callout, or null. If the action 324 in the filter 310 is permit or block and the packet matches the filter 310, the permit or block action is returned to the requesting layer. The permit and block actions are typically used to implement firewall policy. If the action 316 is callout, the policy engine issues its own classification request that includes the full packet, layer parameters, context and identification of the matching filter to the designated callout module 258. The callout module 258 performs its programmed function on the packet, e.g. intrusion detection. The callout may return an action (either permit, block) to the policy engine, which in turn relays the action to the requesting layer. The callout is also capable of maintaining packet context that is likewise returned to the requesting layer via the policy engine 256.

The kernel policy engine or user policy engine also returns a policy context 317. The policy context 317 is used to store policy other than firewall policy, such as security policy or QOS policy. The policy context is any suitable data structure. For example, the policy context is a 64 bit number that is interpreted by a process that added the policy context 317. The policy context in the filter may include actual policy or a value that is used by the system to map to the actual policy.

FIG. 5 illustrates an example of a data structure 330 used for the packet context that is maintained by the kernel and user layers, and the callout modules 258. Each entry includes a layer Id:field Id 332 and a corresponding value 334. The layer Id:field Id 332 has the same meaning as the layer Id:field Id 324 provided as part of the filter conditions 318 in the filters 310 (FIG. 4). Namely, the layer Id:field Id 322 identifies the originating layer and the layer parameter from the originating layer for the data in the value field 334. The value field 334 includes a specific layer parameter.

As a specific example, entry 336 includes the layer Id:field Id 332 "NDIS: Src. MAC Addr." "NDIS" represents a Network Driver Interface Specification implementation of the link layer 274 (FIG. 1). "Src MAC addr." represents a source MAC address. Thus, the layer:field Id 332 indicates that the data in the value field 334 is a source MAC address that was processed by the NDIS (Link) layer. The value field 334 includes the actual source MAC address, which in the example is "00.08.74.4F.22.E5" as expressed in hexadecimal notation.

As a second example, entry 338 has a layer Id:field Id 332 of "NDIS:IF No." This again identifies the layer as NDIS, but in this case identifies the parameter as "IF No" representing an interface number as the specific NDIS parameter. The value field 334 includes the actual interface number, which in this case is 2.

As a third example, entry 340 has a layer Id:field Id 332 of "IP:Dst IP Addr." The "IP" represents the network layer using the IP protocol and the "Dst IP Addr" represents a destination IP address as the IP layer parameter. The value field 334 includes the actual destination IP address of "123.3.2.1."

Having described the underlying firewall architecture, attention is drawn to the functional interfaces of the system and exemplary methods that are performed using the underlying firewall architecture described herein. The functional interfaces are implemented as a plurality of application programming interfaces (APIs). The APIs include the layer API 280, the callout API 284, the filter engine API 266, and the keying module API 288 as illustratively shown in FIG. 6 and FIG. 7.

The layer API 280 facilitates data exchange between the kernel layers and the kernel policy engine 256. By extension, the methods described for the Layer API 280 also facilitate data exchange between the user layers 282 and the filter module 294 and are included as part of the keying module API 288 described below. As shown, the layer API 280 includes a Classify method 350, an Add Layer method 352, and a Delete Layer method 354.

The Classify method 350 is used by the requesting layer to send layer parameters, the packet as received by the requesting, and the packet context to the kernel policy engine 256 or the filter module 288. The kernel policy engine 256 or filter module 288 compares the (1) layer parameters from the requesting layer and (2) packet context entries to the filter conditions 318 in each filter 310 assigned to the requesting layer to identify matching filters. The following is an exemplary implementation of the Classify method. It will be understood that the following methods are described as receiving or returning data values. According to known programming techniques, the methods may use pointers to data values instead of actual data values.

```
NTSTATUS
WFPClassify
(
    IN ULONG                         LayerId,
    IN WFP_INCOMING_VALUES*          pInFixedValues,
    IN WFP_INCOMING_CONTEXT_VALUE*   pInContext,
    PVOID                            pPacket,
    OUT WFP_ACTION_TYPE*             pActionType,
    OUT UINT64*                      pOutContext
);
```

Where the following characterizes the recited parameters.

LayerId identifies the kernel or user layer issuing the classification request, i.e. the requesting layer. Referring to FIG. 3, the Layer Id identifies the layer as the data stream layer 268, the transport layer 270, the network layer 272, the link layer 274 or a user layer such as the keying module layer. Other layers are valid if added to the system.

pInFixedValues includes a subset of the layer parameters processed by the requesting layer. The pInFixedValues, along with the packet context entries, are compared to the filter conditions to determine if the packet matches the filter. The default layer parameters included in the pInFixedValues for kernel layers are identified in Table A below. There are no default parameters for the user layers. It will be understood that the following values are exemplary only as an advantage of the architecture is that it allows the layers to use any values accessible to that layer.

TABLE A

| Layer | Default Layer Parameters |
|---|---|
| Link Layer | Source and Destination MAC Addresses; Interface Number |
| Network Layer | Source and Destination IP Addresses; Protocol Type; Local Address Type |
| Transport Layer | Source and Destination Port Numbers; |
| Application | Deciphered application layer protocol payload | pInContext includes the context data structure 330 (FIG. 5) as received by the requesting layer. The packet context is used in conjunction with the layer parameters to identify matching packets.

pPacket includes the entire packet as received by the requesting layer.

pActionType includes the action 316 that is returned to the requesting layer. The action 316 returned is permit, block, continue, or null as identified in the matching filter, or callout modules executed by the matching filter. As previously described, the action 316 is used to implement and identify network firewall policy.

pOutContext includes the policy context data. As previously described, the policy context is used to implement network policies associated with IPSec, QOS and any other non-firewall filter based policy.

The Add Layer 352 and Delete Layer 354 methods are used to add and remove a user or kernel layer from the management module 214, respectively. The following is an exemplary form of the Add Layer 352 method.

NTSTATUS
AddExtensionLayer(OUT PULONG pLayerId);

Where in the following characterizes the recited parameter.

pLayerId is a unique layer identification value returned to the layer being added, i.e. the layer executing the Add Layer method.

In an embodiment of the invention, certain layers are included in the architecture when the operating system is initiated. Examples of such layers include the link, network and transport layers. Accordingly, the AddExtensionLayer method is not required to include these layers in the framework. A LayerSetProperties method is provided to identify, for the policy engine, which fields are valid filter conditions for the layer, how to calculate the filter weight, and the like. The following is an exemplary form of the LayerSetProperties method/

```
WIN32_ERR WINAPI FwpmLayerSetProperty0
(
    IN FWPM_ENGINE_HANDLE engineHandle,
    IN const GUID* layerId,
    IN const FWPM_LAYER_PROPERTY0* layerProperty
);
```

Wherein the following characterizes the recited parameters.

enginehandle is a handle to the policy engine.

layerId identifies the layer.

layerProperty identifies the layer properties including the layer fields and calculation of filter weight.

The following is an exemplary form of the Delete Layer 406 method.

NTSTATUS
RemoveExtensionLayer(ULONG LayerId);

LayerId identifies the layer being removed; i.e. the layer executing the Delete Layer method.

The Callout API 284 facilitates data exchange between the kernel or user policy engine and the callouts. Like the Layer API 280, the Callout API 284 has a Classify method. The Classify method 356 of the Callout API 284 is similar to the Classify method 402 of the Layer API 280 except that it also includes matching filter data. The following is an exemplary form of the Classify method 356 used to execute a callout.

```
typedef NTSTATUS (*WFP_CALLOUT_CLASSIFY_FN)
(
    IN const WFP_INCOMING_VALUES*         fixedValues,
    IN WFP_INCOMING_CONTEXT_VALUE*        wfpContext,
    IN VOID*                              packet,
    IN WFP_FILTER*                        matchedFilter,
    OUT WFP_ACTION_TYPE*                  action,
    OUT UINT64*                           outContext
);
```

Wherein the following characterizes the recited parameters.

fixedValues includes the layer parameters sent from the requesting layer. The fixedValues is the same data provided by the requesting layer in pInFixedValues data sent as part of the Classify method 350 in the layer API 280.

wfpContext includes the context data structure 330 (FIG. 5). This data is the same as sent by the requesting layer in the pInContext sent as part of the Classify method 350 in the layer API 280.

packet includes the entire packet as received by the requesting layer. This data is the same as sent by the requesting layer in the pPacket sent as part of the Classify method 350 in the layer API 280.

matchedFilter identifies the filter requesting the callout. Typically, the matching filter is identified by the filter Id 312 of the matching filter 310 initiating the Classify method 350 of the callout API 284.

pActionType includes the action that is returned to the kernel or user policy engine from the callout 258. If the pActionType is Permit or Block, it is returned to the requesting layer as the pActionType returned by the Layer API 280. The callout can also return a Continue action that instructs the policy engine to continue applying matching filters to the packet.

pOutContext includes the policy context data, such as security or QOS policy data.

The callout API 408 also includes the Notify method 358. The Notify method 358 is used to notify a callout when a filter 310 is added to the set of installed filters 282 that identifies as one of its Actions 316, the callout module 258. The Notify provides the callout with an opportunity to take any required action such as allocating or de-allocating buffers that will be used by the callout 258 when it is executed by the policy engine 256. The following is an exemplary form of the Notify method 358.

```
typedef NTSTATUS (*WFP_CALLOUT_NOTIFY_FN)
(
    IN WFP_NOTIFY_ENUM    notify,
    IN WFP_FILTER*        filter
);
```

Wherein the following characterizes the recited parameters.

notify includes a numerical value that indicates whether the filter is being added or deleted. For example, a value of 1 indicates the filter is being added and a value of 2 indicates that the filter is being deleted.

filter identifies the filter being added or deleted by unique value. This may be accomplished by providing the Filter Id 312 included as part of the filter 310.

The callout API also includes a Callout Registration method 360 and Callout Deregistration 362 method to add and remove callout modules, respectively. An exemplary form the Callout Registration method 360 is as follows:

```
NTSTATUS WfpRegisterCallout
(
    IN const GUID*                  calloutId,
    IN const WFP_CALLOUT*           callout,
    IN const SECURITY_DESCRIPTOR*   sd
);
```

Wherein the following characterizes the recited parameters.

callout Id provides a unique identification for the registering callout module.

callout provides any callout specific information such as a driver service name, device name, and pointers to the callout classify and notify functions.

sd provides a security descriptor for the callout. The security descriptor identifies which processes can and read and delete the callout.

An exemplary form of the Callout Deregistration method 362 is as follows:

```
NTSTATUS WfpDeregisterCallout
(
    IN const GUID*    calloutId
);
```

Wherein the following characterizes the recited parameter.

callout Id is the unique Id of the callout to be removed.

The filter engine API 266 facilitates data exchange between the user policy engine 260 and the kernel policy 256 engine. As shown, the filter engine API 266 includes an Add Filter method 364, a Delete Filter method 366, and an Enum Layer method 368.

The Add Filter 364 and Delete Filter 366 methods are used to add a new filter to the set of installed filters 282 and to delete an existing filter from the set of installed filters 282, respectively. The following is an exemplary form of the Add Filter method 364.

```
NTSTATUS
AddFilterToLayer
(
    ULONG          LayerId,
    WFP_FILTER*    pFilter
);
```

Wherein the following characterizes the recited parameters.

LayerId identifies the layer assigned to the filter.

pFilter is the filter 310 being added to the set of installed filters 282.

The following is an exemplary form of the Delete Filter method 366.

```
NTSTATUS
DeleteFilterFromLayer
(
    ULONG    LayerId,
    ULONG    FilterId
);
```

Wherein the following characterizes the recited parameters.

LayerId identifies the layer that the filter is assigned to.

pFilter is the filter being deleted from the set of installed filters.

The Enum Layer method 368 provides a mechanism for the user policy engine 260 to identify all filters matching a set of criteria. This allows the management API to identify conflicting filters for filter arbitration and conflict resolution. The following is an exemplary form of the Enum Layer method 368.

```
IndexStartEnum
(
    PWFP_ENUM_TEMPLATE      pEnumTemplate,
    OUT PULONG              pMatchCount,
    OUT PWFP_ENUM_HANDLE    pEnumHandle
)
```

Wherein the following characterizes the recited parameters.

pEnumTemplate includes a data structure defining the filters to be returned. For example, it include parameters that the filter conditions must match for the filter to be returned.

pMatchCount includes the number of filter matches based on the specified pEnumTemplate.

pEnumHanlde includes a reference to the matched filter entries.

The keying module API 288 provides an interface between user mode keying module layers 282 and the user policy engine 260. The keying module API 288 includes an IPSec SA Acquire method 370, an Expire Notify method 372, and an IPSec SA Acquire Complete method 374, a Keying Module Register method 376, a Keying Module Deregister method 378, an IPSec Inbound Get SPI method 380, an Add Inbound SA method 382, an Add Outbound SA method 384, an Inbound SA Expire 386 method, and a Keying Module Initiate method 388. The keying module API 288 may also include the methods previously described for the layer API.

The keying module API is used to facilitate use of known security protocols, such as defined by IPSec, used by an initiating computer, user, or service and a responding computer, user, or service. IPSec includes protocols such as AH and ESP. The ESP protocol is an authenticating and encrypting protocol that uses cryptographic mechanisms to provide integrity, source authentication, and confidentiality of data. The AH protocol is an authentication protocol that uses a hash signature in the packet header to validate the integrity of the packet data and authenticity of the sender.

The IKE protocol provides a method for an initiating computer and a responding computer to negotiate security settings used with the AH and ESP protocols. The negotiated security settings form a data structure called a security association (SA). The SA defines parameters such as an authentication algorithm, encryption algorithm, keys, and the lifetime of keys, used by ESP or AH to protect the contents of an IP packet. Because ESP and AH require an SA, an exemplary method is to use an IKE negotiation before the ESP or AH protocols are used by the initiating and responding computer. Alternatively, the SA can be manually created. A given SA is identified by a value known as a Security Parameter Index (SPI).

Each of the initiating and responding computers include an IPSec driver and classification module that determine, based on an IPSec policy, whether data sent between the initiating and responding computers requires encryption or authentication. The IPSec policy is a set of filters that defines how the network device uses IPSec and includes filter lists, authentication methods, and other information. In an embodiment of the invention, the IPSec policy is defined by filters included in the set of installed filters in the kernel policy engine or the filter module 294. The policy that applies to a packet is identified by invoking the keying module layer which uses the Classify method to identify matching filters.

The IPSec SA Acquire method 370 is called by the user policy engine 260 (via a client proxy) to pass a driver acquire or an external initiate request to the keying module layer. The keying module layer returns this call and does the negotiation asynchronously. Once the keying module layer has completed the negotiation, the keying module layer calls the IPSec SA Acquire Complete method 374 to notify the user policy engine that the negotiation is complete. The following is an exemplary form of the IPSec SA Acquire method.

```
typedef WIN32_ERR
(*PROCESS_IPSEC_SA_ACQUIRE0)
(
    IN FWP_IPSEC_ACQUIRE_CONTEXT0    ipsecContext,
    IN const FWP_IPSEC_SA_ACQUIRE0*  acquire,
    IN FWP_IPSEC_SPI                 inboundSAspi
);
```

Wherein the following characterizes the recited parameters.

ipsecContext is a handle to link the acquire with the SA being added.

acquire includes the necessary information for negotiating the SA according to known protocols such as IKE.

inboundSAspi includes a SPI that is used for an inbound SA.

The Expire Notify method 372 is called to pass an expire-notify to the keying module layer that added the inbound SA. The following is an exemplary form the Expire Notify method.

```
typedef VOID
(*PROCESS_IPSEC_SA_EXPIRE0)
(
    IN const FWP_IPSEC_SA_EXPIRE_NOTIFY0* expireNotify
);
```

Wherein the following characterizes the recited parameters.

expireNotify contains information identifying the expiring SA. For example, in the case of an outbound SA, the SPI is provided.

The IPSec SA Acquire Complete 374 method is called by a keying module layer to close the user policy engine's context after it has finished negotiation and added all the SAs, or after it has come across an error. After this method is executed, the keying module layer does not reuse the ipsecContext for any other API method. The following is an exemplary form the IPSec SA Acquire Complete method.

```
WIN32_ERR
FwpIPSecSAAcquireComplete0
(
    IN FWPM_ENGINE_HANDLE          engineHandle,
    IN FWP_IPSEC_ACQUIRE_CONTEXT0  ipsecContext,
    IN const FWP_IPSEC_NEGOTIATION_ status
        STATUS0*
);
```

Wherein the following characterizes the recited parameters.

engineHandle provides a handle to the user policy engine 260.

ipsecContext is the context passed by user policy engine with the IPSec Acquire method.

status provides status and other details of the SA negotiation. The status is returned by the user policy engine 260 if the acquire was externally initiated via FwpKeyingModuleInitiate0.

The Keying Module Register method 376 is called by a keying module layer to register with the user policy engine 260 and pass its function pointers. The following is an exemplary form of the Keying Module Register method.

```
WIN32_ERR
FwpKeyingModuleRegister0
(
    IN FWPM_ENGINE_HANDLE          engineHandle,
    IN const GUID*                 keyingModuleID,
    IN const FWP_KEYING_MODULE_INFO0* keymodInfo
);
```

Wherein the following characterizes the recited parameters.

engineHandle provides the handle to the user firewall engine 260.

keyingModuleID is a unique ID for the keying module layer.

keymodInfo includes registration information about the keying module layer such as pointers to process IPSec SA Acquire and process IPSec SA Expire functions.

The Keying Module Deregister method 378 is called by the keying module layer to deregister the keying module from the user policy engine 260. The following is an exemplary form of the Keying Module Deregister method.

```
WIN32_ERR
FwpKeyingModuleDeregister0
(
    IN FWPM_ENGINE_HANDLE          engineHandle,
    IN const GUID*                 keyingModuleID
);
```

Wherein the following characterizes the recited parameters:

enginehandle is the handle to the user policy engine 260.

keyingModuleID is the unique ID of the keying module layer.

The IPSec Inbound Get SPI method 380 is called by the keying module layer to obtain the SPI for a new inbound SA. The IPSec Inbound Get SPI method 380 is usually used when the keying module layer executes in a responding network device. The following is an exemplary form the IPSec Inbound Get SPI method.

```
WIN32_ERR
FwpIPSecSAInboundGetSpi0
(
    IN FWPM_ENGINE_HANDLE          engineHandle,
    IN const FWP_IPSEC_TRAFFIC0*   ipsecTrafficDescription,
    IN const FWP_IPSEC_UDP_ENCAP0* udpEncapInfo,
    OUT FWP_IPSEC_SPI*             inboundSpi
);
```

Wherein the following characterizes the recited parameters.

engineHandle is the handle to the user firewall engine 260.

ipsecTrafficDescription is a 5-tuple description for creating an inbound larval SA. The 5-tuple includes source and destination IP addresses, source and destination ports, and transport layer protocol type.

udpEncapInfo is UDP encapsulation data for creating the larval SA. UDP encapsulation is a known method of embedding a packet formatted according to a security protocol into an unencrypted UDP packet.

inboundSpi is the SPI for the inbound SA.

The Add Inbound SA method 382 is called by the keying module layer to add an inbound SA, i.e. update the larval SA. The user policy engine 260 uses the SPI in the SA to map this call to its internal state, and ioctl the SA down to the IPSec driver. The following is an exemplary form of the Add Inbound SA method.

```
WIN32_ERR
FwpIPSecSAInboundAdd0
(
    IN FWPM_ENGINE_HANDLE          engineHandle,
    IN const FWP_IPSEC_SA_STRUCT0* inboundSA
);
```

Wherein the following characterizes the recited parameters.

engineHandle in the handle to the user policy engine.

inboundSA includes the inbound SA.

The Add Outbound SA 384 method is called by a keying module layer to add an outbound SA. The user policy engine uses an inbound SPI parameter to map this call to its internal state, and ioctl the SA down to the IPSec driver. The following is an exemplary form the Add Outbound SA method:

```
WIN32_ERR
FwpIPSecSAOutboundAdd0
(
    IN FWPM_ENGINE_HANDLE          engineHandle,
    IN FWP_IPSEC_SPI               inboundSpi,
    IN const FWP_IPSEC_SA_STRUCT0* outboundSA
);
```

Wherein the following characterizes the recited parameters.

engineHandle is the handle to the user firewall engine 260.

onboundSpi is the SPI for the inbound SA, with which an outbound SA is paired.

outboundSA includes the outbound SA.

The Inbound SA Expire method 386 is called by the keying module layer to expire the inbound SA that was previously added. The following is an exemplary form the Inbound SA Expire method 386.

```
WIN32_ERR
FwpIPSecSAInboundExpire0
(
    IN FWPM_ENGINE_HANDLE        engineHandle,
    IN const FWP_IPSEC_SA_EXPIRE0*   expire
);
```

Wherein the following characterizes the recited parameters.
enginehandle is the handle to the user firewall engine 260.
expire includes data for the SA to be expired.

The Keying Module Initiate method 388 is called by known external application like RAS, Winsock API, and the like to initiate the keying module layer and setup SAs before an application starts sending its network traffic. The user policy engine 260 asynchronously pends the RPC call, gets the SPI from an IPSec driver, and passes the acquire to the appropriate keying module. Once the keying module layer calls FwpIPSecSAAcquireComplete0, the user firewall engine completes the asynchronous RPC with the negotiation status. The following is an exemplary form of the Keying Module Initiate method.

```
WIN32_ERR
FwpKeyingModuleInitiate0
(
    IN FWPM_ENGINE_HANDLE          engineHandle,
    IN const FWP_IPSEC_SA_ACQUIRE0*   acquire,
    IN HANDLE                      waitEvent,
    OUT FWP_IPSEC_NEGOTIATION_STATUS0*  negotiationStatus
);
```

Wherein the following characterizes the recited parameters.
engineHandle is the handle to the user policy engine 260.
acquire includes data necessary for negotiating an SA.
waitEvent is a handle to an event that is triggered when negotiation status is available. If a client, i.e. calling external application, is not interested in waiting for the negotiation to complete, it can set this parameter to NULL. Internally the client proxy optionally passes this event to RPC and request it to set the event once the asynchronous RPC call completes.
negotiationStatus includes an outcome of the negotiation. The negotiationStatus is NULL if waitEvent is NULL. Otherwise negotiationStatus remains valid until the waitEvent is triggered.

Figure 8:
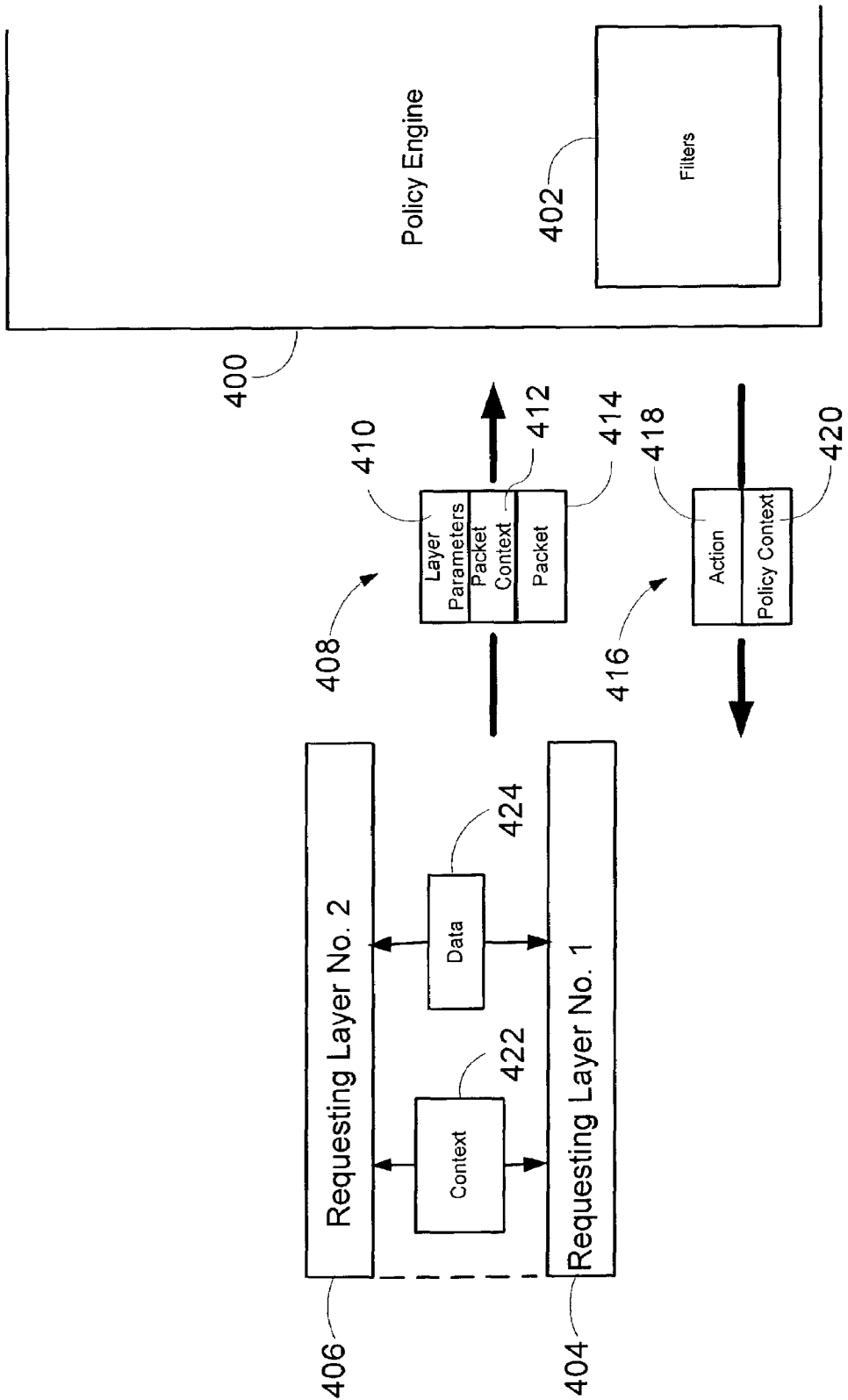
FIG. 8 is a block diagram illustrating a requesting layer obtaining policy for data.

FIG. 8 illustrates the methods used to find matching filters for a packet and return the action and/or policy context to a requesting layer. As shown, a first requesting layer 404 obtains network policy by issuing a request 408 to the policy engine 400. The policy engine 400 is the kernel policy engine 256 or the user policy engine 260 with filter module 294. The policy engine 400 includes installed filters 402 defining a plurality of network policies, for example security, QOS, and firewall policy.

The first requesting layer 404 may be a user mode layer 282, such as the keying module layer, or a kernel layer 254, such as one of the layers in the network stack. The first requesting layer 404 communicates with the policy engine 400 via the layer API.

The request 408, e.g., a classification request using the Classify method, includes the layer parameters 410, the packet context 412, and the full packet 414 as received by the requesting layer 404. The policy engine 400 uses the layer parameters 410 and the packet context 412 to identify any matching filters from the installed filters 402. Typically, the policy engine 400 applies filters in order of the weight specified by the matching filters. The policy engine 400 then returns values 416 including an action 418 and the policy context 420. The action 418 is used to return firewall policy such as permit or block. The policy context 420 is used to return other policy such as security or QOS policy. The returned action 418 and policy context 420 are indicated as none or null where the filter does not include corresponding policy.

The first requesting layer 404 may interact with a second requesting layer 406. This occurs when the requesting layer is a kernel layer 254 in the network stack. The first requesting layer 404 may update the packet context 422 with the layer parameters processed by the requesting layer. The first requesting layer 404 also may process the packet according to a layer protocol. The requesting layer passes the modified packet context 422 to the second requesting layer 406. The requesting layer also passes the packet 424, after it is processed according to the layer protocol. For example, if the first requesting layer 404 implements the IP protocol, it processes the packet according to the IP protocol. The first requesting layer then passes the packet to the second requesting layer 406, which in the case of an inbound packet is a transport protocol layer and in the case of an outbound packet is a link layer. The second requesting layer 406 may then repeat the process by sending a classification request and receiving returned action and policy context values.

Figure 9:
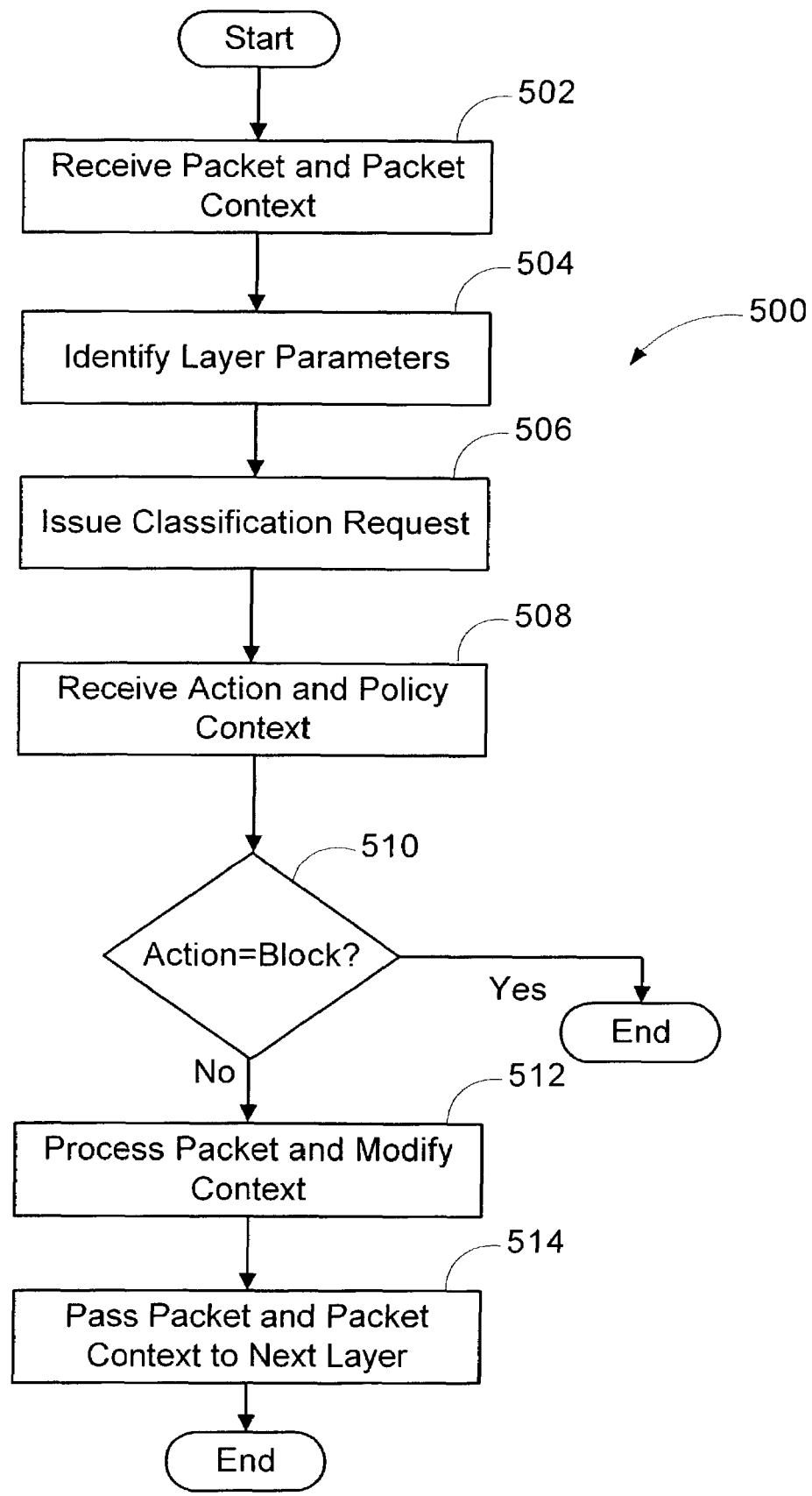
FIG. 9 is a flow chart illustrating a method used by a requesting layer to implement network policy.

FIG. 9 illustrates a method, labeled 500, used by the requesting layer to obtain applicable network policy, e.g., action and policy context, for a packet. In step 502, the requesting layer receives the full packet and corresponding packet context from a previous layer or another process or program module In step 504 the requesting layer identifies the layer parameters. The layer parameters are the parameters to be used, in combination with packet context, to identify matching filters. The default layer parameters are described above in Table A and are included in the pInFixedValues of the Classify method 350.

In step 506, the requesting layer issues the classification request to the kernel or user policy engine. An exemplary method of issuing classification requests was described with the reference to the Classify method 350 in the layer API 280.

In response to the classification request, an action and policy context is returned to the requesting layer as shown in step 508. The requesting layer determines, based on the returned action, whether to drop the packet 508. If the policy engine returns block as the action then the requesting layer drops the packet. The requesting layer may also drop the packet if the policy engine returns the action as no matching filters found. As previously described, the action is used to implement firewall policy. If the matching filters do not include firewall policy, the returned action may be none or null.

Steps 510, 512, 514 are normally only carried out when the requesting layer is a layer in the network stack, but are optionally carried out by user mode layers. If the returned action is permit, further packet processing occurs. In step 510, the requesting layer modifies the packet context to include layer information, typically the same type of information that was included as the layer parameters in the classification request. Thus, Table A (above) not only identifies the layer parameters but also the default information added by each layer to the packet context. The packet context is maintained in a data structure such as the data structure described with reference to FIG. 5.

In step 512, the requesting layer processes the packet according to the protocol implementation for that layer. Such processing is well known and need not be described in detail herein. Exemplary protocol implementations include HTTP, FTP, SMTP, and RPC for the application layer, TCP and UDP for the transport layer, IP for the network layer, and NDIS for the link layer.

In step 514, the requesting layer passes the packet, processed according to the layer protocol, along with the modified packet context to a next layer. The process 500 is repeated by each layer and continues until the packet traverses all layers in a series of layers, e.g., the layers in the network stack, or until the packet is dropped by one of the layers.

Figure 10:
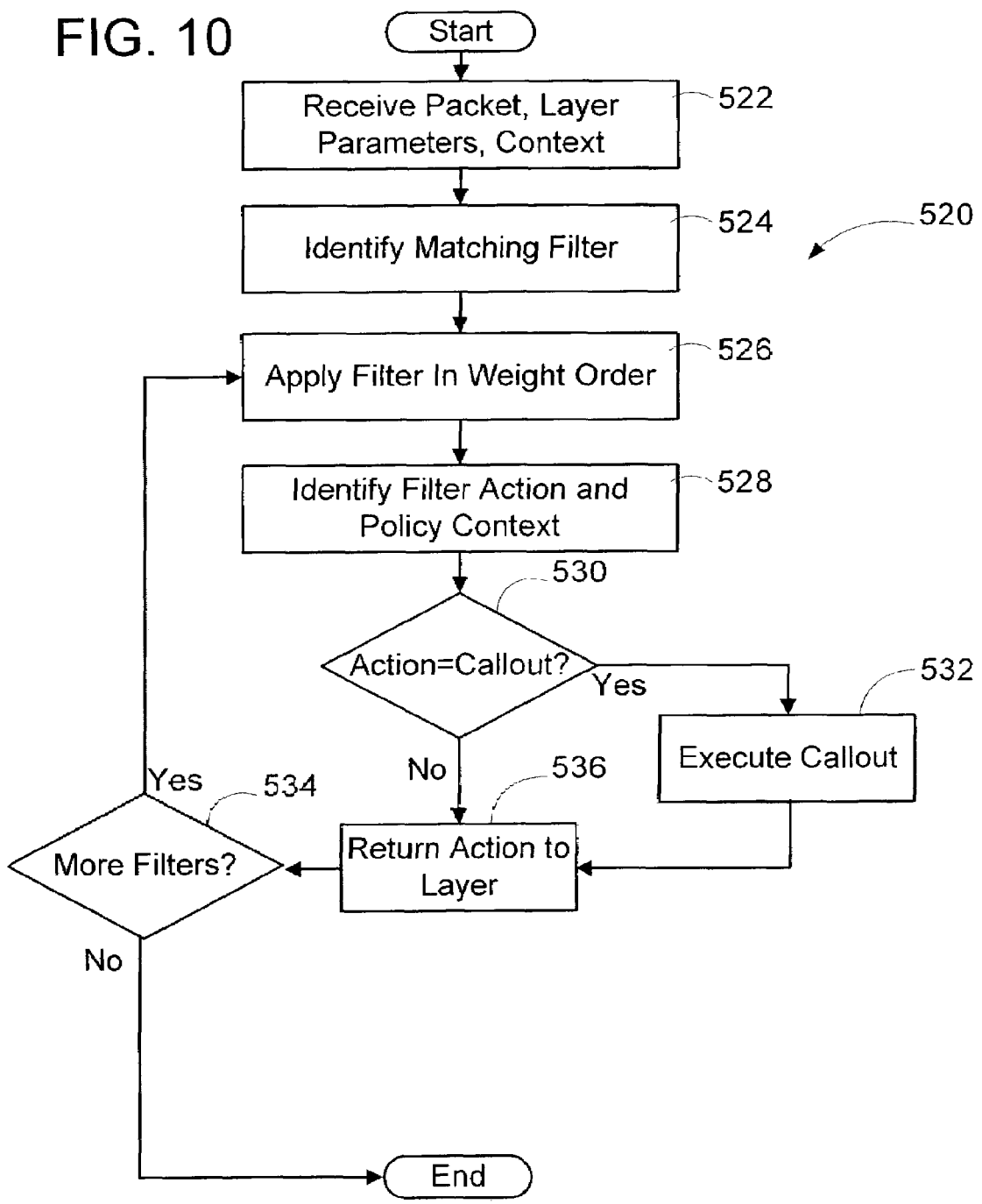
FIG. 10 is a flow chart illustrating a method used by a policy engine to identify network policy for data.

Referring to FIG. 10, a method 520 used by the kernel or user policy engine to identify matching filters and return the action and policy context to the requesting layer will now be described. In step 522, the policy engine receives the packet, layer parameters, and packet context from the requesting layer via the appropriate API.

In step 524, the policy engine identifies one or more matching filters. In an embodiment of the invention, filters are assigned to a particular requesting layer. The policy engine only attempts to identify filters as matching if the filter is assigned to the requesting layer and the packet parameters match all filter conditions 318 (FIG. 5). As previously described the packet parameters include both layer parameters from the requesting layers and the packet context. After all matching filters are identified, the policy engine orders the filters based on the weight field 314 in each matching filter. Alternatively, filters are not assigned to a particular requesting layer and all filters may be a matching filter.

In step 526, the policy engine applies the filter with the highest weight field 314 that has not yet been applied. Specifically, the policy engine identifies the action 316 specified in the filter and the policy context. If the action 316 designates a callout module, the policy engine 256 executes the callout. The callout may return an Action to the policy engine.

If the action was not callout, or after the callout is executed, the policy engine returns an associated action and policy context from the matching filter or as identified by the callout, to the requesting layer as shown in step 536. Alternatively, the policy engine waits to execute step 536, i.e. return the action, until all matching filters have been applied.

In step 534, the policy engine determines if any additional matching filters exist. If not, the process terminates. If additional matching filters do exist, the process returns to step 526 where the next highest priority filter is applied. The process continues until all matching filters are applied. Alternatively, the process terminates once a terminating action is identified for the packet. An action type may be defined as a terminating action. By default, permit and block are terminating actions. If no matching filters are identified for the packet, the policy engine notifies the requesting layer that no matching filters were found.

Figure 11:
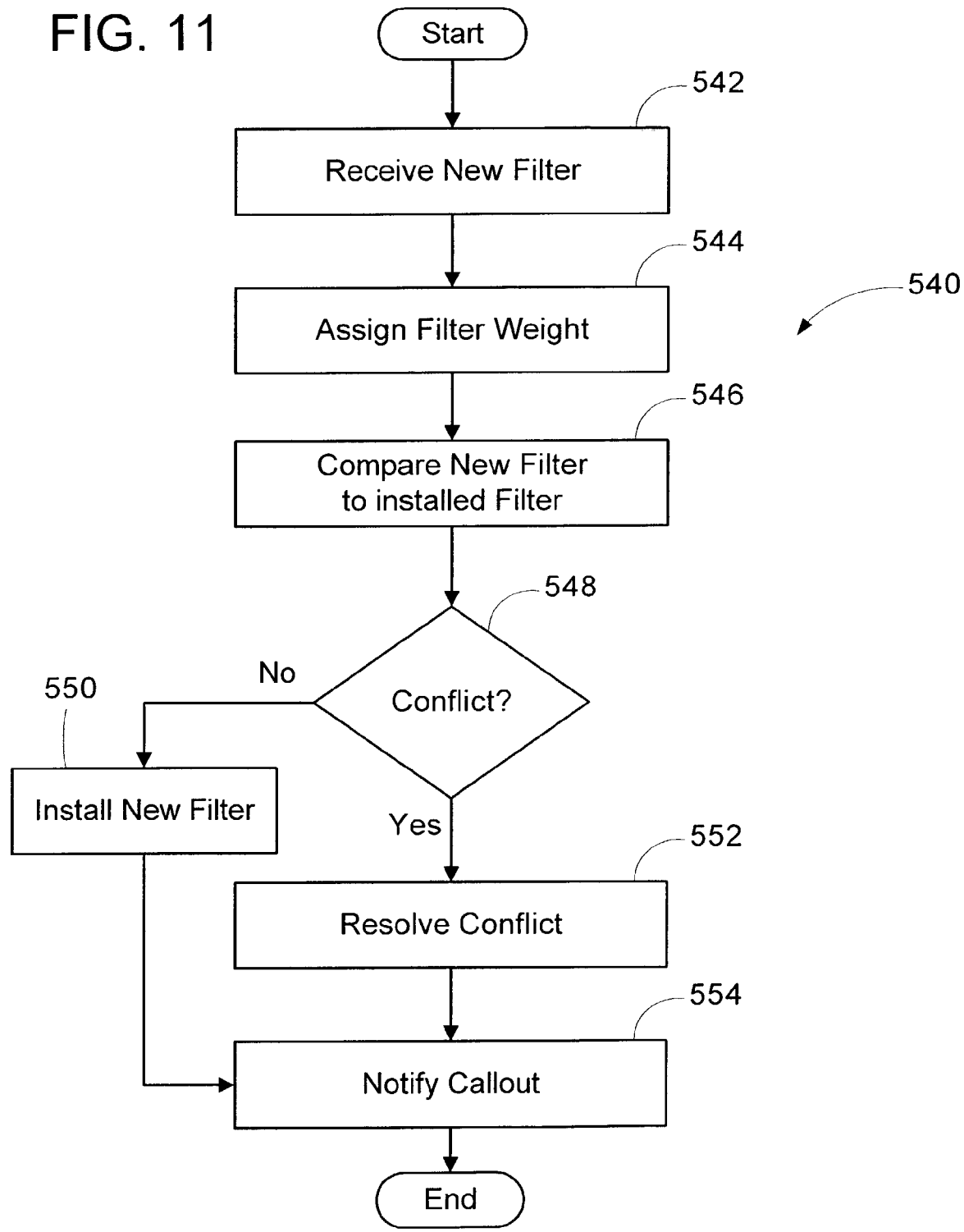
FIG. 11 is a flow chart illustrating a method used to add new policy filters into a policy engine.

FIG. 11 illustrates the process 540 used by the user policy engine 260 to add new filters into the set of installed filters. The filters may be installed into the kernel policy engine 256 or into the filter module 294. In step 542, the user policy engine receives policy from one of the policy providers 262. The policy providers include known processes such as LIPS, GUIs, and the like. If necessary, the user policy engine places the policy in filter form by defining the policy in terms of filter conditions, an action, and policy context.

In step 544, the filter is assigned a weight value by the user policy engine. The weight value is assigned by the policy provider, e.g. manually by a user via the policy provider GUI. Alternatively, the user policy engine automatically calculates the weight value. The kernel policy engine 256 uses any suitable method to calculate weight. For example, filters with more specific filter conditions are given higher weight values than less specific filters. More specific filters have filter conditions that match a smaller number of potential packets. For example, a filter that includes a single IP address as its filter conditions is more specific than a filter that includes a range of IP addresses as its filter conditions.

In step 548, the user policy engine 260 compares the new filter to each of the installed filters assigned to the same layer to identify any conflicts. To conflict the filters must share a common set of filter conditions such that they will act on the same packet and identify different actions. For example, if the filter condition for the installed filter is a source IP address in the range of 123.4.0.0 to 123.4.0.100 with an associated action of permit and the new filter has filter condition with source IP addresses in the range 123.4.0.50 to 123.4.0150, with an associated action of block, the new and installed filter overlap to the extent both filter conditions include the IP address range 123.4.0.50 to 123.4.0.100.

If the filters conflict, the user policy engine 260 resolves the conflicting using any suitable technique as shown in step 552. A method for calculation of filter weight and identifying and resolving filter conflicts is described in copending U.S. patent application Ser. No. 10/456,322. entitled "Method for Managing Network Filter Based Policy," attorney docket number 221037. The new filter may be added to the set of installed filters as part of the conflict resolution process. If the new filter does not conflict with the set of installed filters, the new filter is added into the set of installed filters, either in the user policy engine or the kernel policy engine as shown in step 550.

Figure 6:
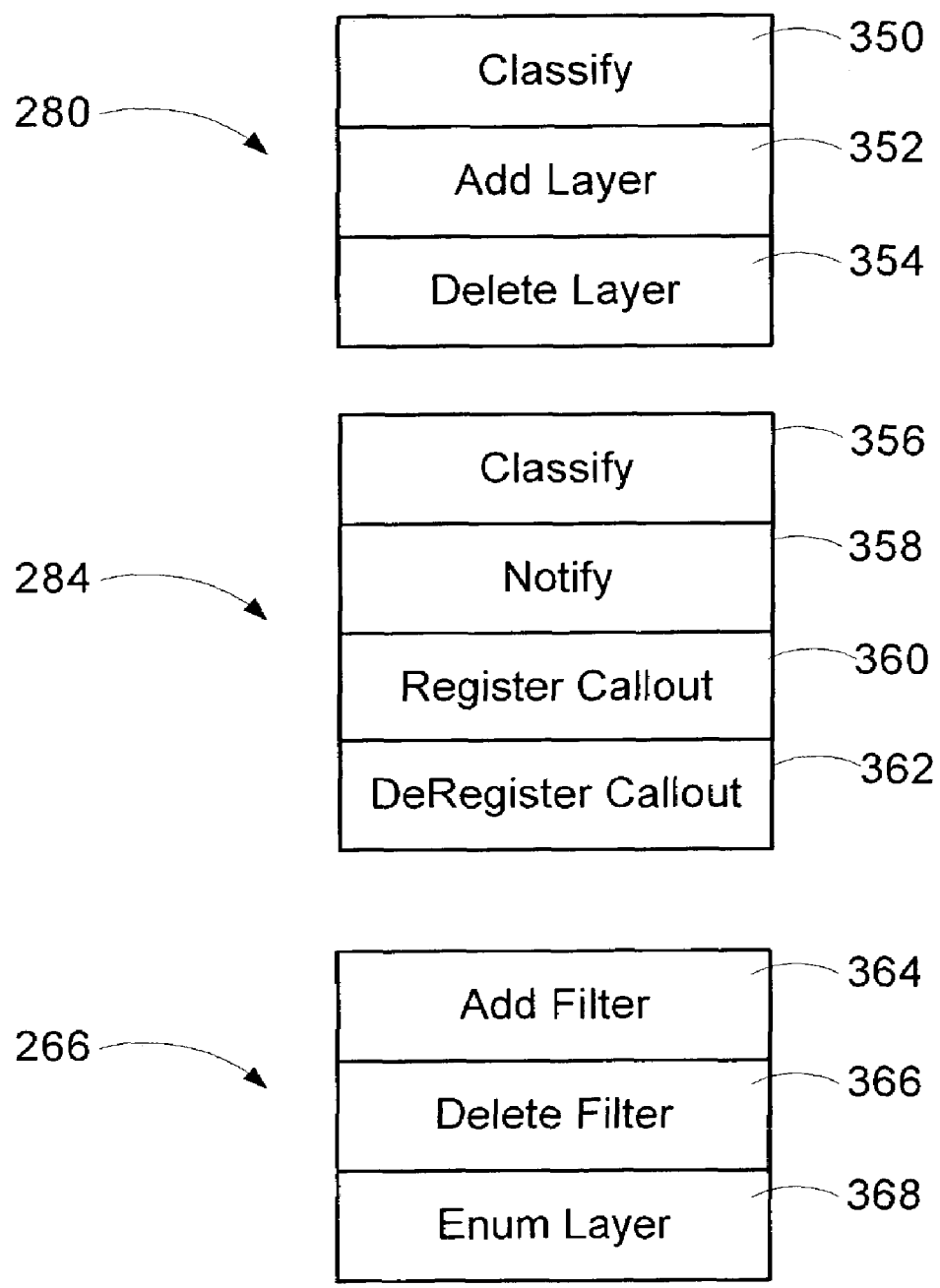
FIG. 6 illustrates exemplary application programming interfaces used with the present invention.
Figure 7:
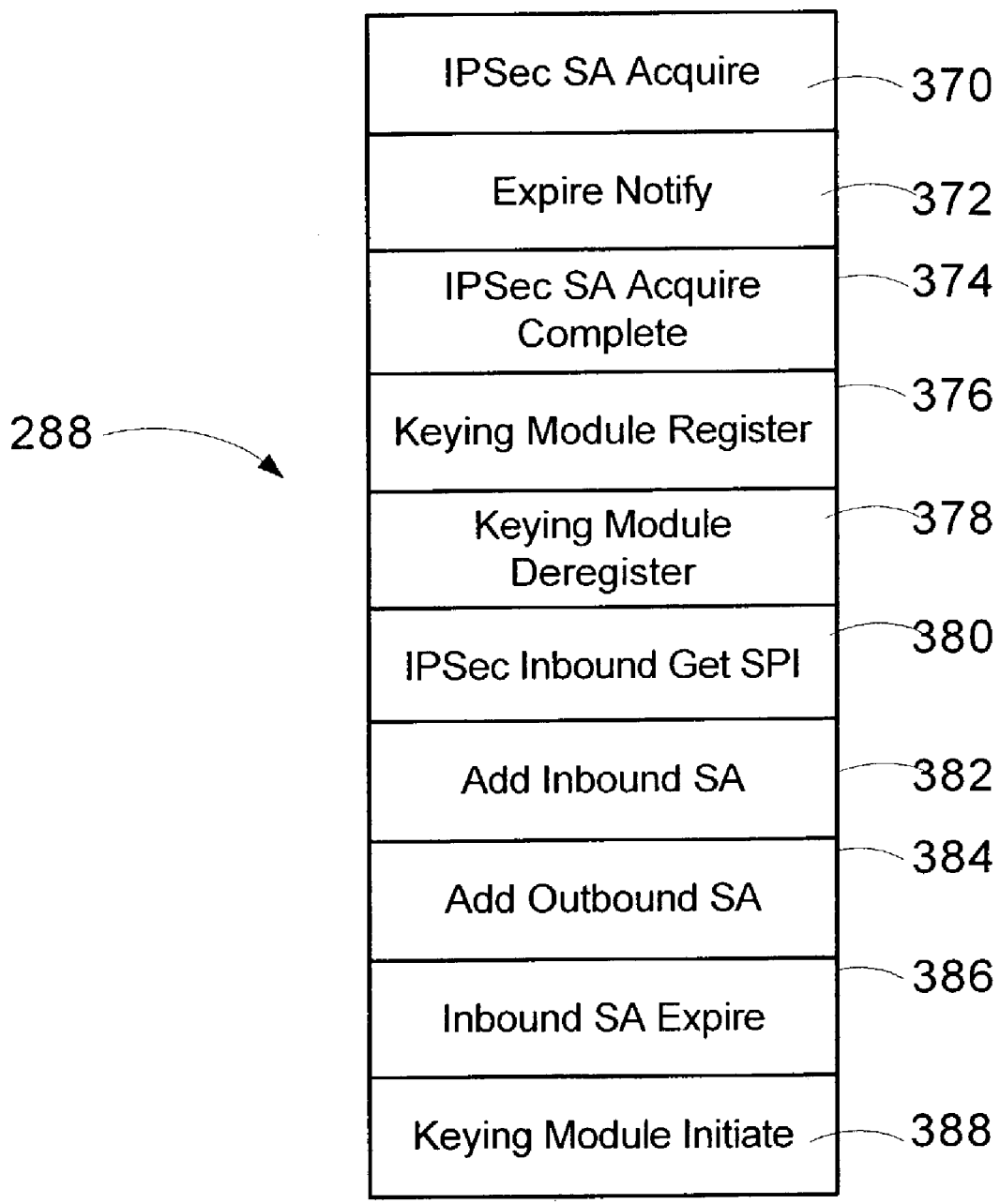
FIG. 7 illustrates an exemplary application programming interface used with the present invention.

If the new filter is loaded into the set of installed filters, any callouts that are executed by the filter, i.e. the callouts are included as an associated action in the filter are notified as shown in step 554. An exemplary method of notifying the callout was described with reference to the Notify method 412 described as part of the callout API 284 (FIG. 6).

All of the references cited herein, including are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. The present invention can be used to manage and execute filters and filter based polices of these and additional processes. Therefore, the invention as described herein contemplates all such embodiments as may come within the scope of the following claims and equivalents thereof.

We claim:

1. A method for determining a plurality of network policies to be applied to a packet at a first layer process from a plurality of layer processes, comprising:
   identifying, by the first layer process, a set of parameters associated with the packet received from a second layer process from the plurality of layer processes;
   sending, by the first layer process, a request to identify the network policies to be applied to the packet; the request including the parameters associated with the packet and parameters associated with the first layer process;
   receiving, at the first layer process, a response that includes a first policy value identifying a first network policy and a second policy value identifying a second network policy, wherein the first policy value comprises an action and the second policy value comprises a policy context; and
   if the action is an instruction to allow the packet to continue network traversal, processing the packet according to a protocol implemented by the first layer process and sending the packet to a third layer process from the plurality of layer processes.

2. The method of claim 1, wherein the first layer process is a user layer.

3. The method of claim 1, wherein the first layer process is a kernel layer.

4. The method of claim 1, wherein the first network policy is a firewall policy and the first policy value is an action value.

5. The method of claim 4, wherein the action value is permit indicating that the packet is permitted to further traverse a network or block indicating that the packet is blocked from further network traversal.

6. The method of claim 1, wherein the second network policy is a security policy that defines key negotiation protocol parameters.

7. A method for installing and maintaining a plurality of network policies in a policy engine associated with a network device, comprising:
   receiving a new filter to be installed into the policy engine including a plurality of filters, wherein each filter comprises a set of filter conditions, a first policy value identifying a first network policy, and a second policy value identifying a second network policy;
   comparing the new filter to each filter from the plurality of filters;
   if installing the new filter results in a conflict between the new filter and at least one filter from the plurality of filters, resolving the conflict;
   installing the new filter; and
   if the new filter comprises the first network policy being a firewall policy and the first policy value being a callout to at least one callout module, notifying the at least one callout module about the new filter.

8. The method of claim 7, wherein the first network policy is a firewall policy and the second network policy is a security policy.

9. The method of claim 8, wherein the security policy is an IPSec policy.

10. The method of claim 8, wherein the first policy value is an action and the second policy value is a policy context.

11. The method of claim 7, further comprising: identifying, by the policy engine, a matching filter from the plurality of filters that includes filter conditions matching a packet to which the plurality of network policies is to be applied; and executing at least the first network policy on the packet.

12. The method of claim 7, wherein the step of installing the new filter is executed in an operating system user mode.

13. The method of claim 7, wherein the step of installing the new filter is executed in an operating system kernel mode.

14. The method of claim 7, wherein the plurality of network policies include a firewall policy, a security policy, and a quality of service policy.

15. The method of claim 7, wherein the set of filter conditions is dynamically configurable such that filter conditions are added or deleted according to desired policy.

* * * * *